June 2, 1964 R. BICKEL 3,135,305
POWER FEEDER FOR A WOODWORKING MACHINE
Filed Oct. 5, 1961 3 Sheets-Sheet 1

INVENTOR.
RAYMOND BICKEL
BY
ATTORNEY

INVENTOR.
RAYMOND BICKEL

June 2, 1964 R. BICKEL 3,135,305
POWER FEEDER FOR A WOODWORKING MACHINE
Filed Oct. 5, 1961 3 Sheets-Sheet 3
FIG. 6
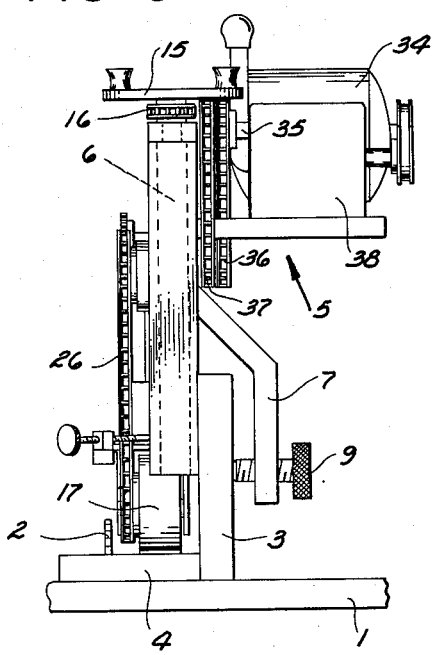
FIG. 7
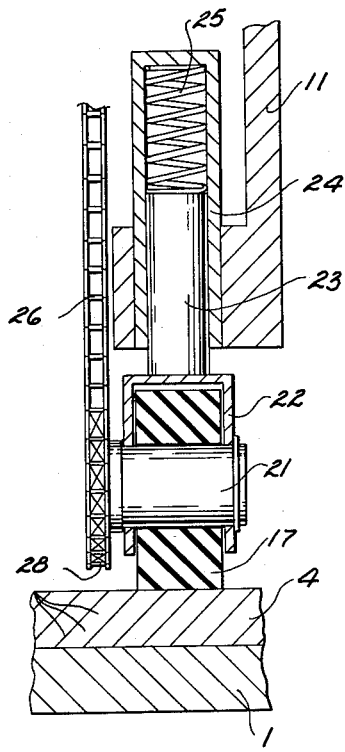
FIG. 8
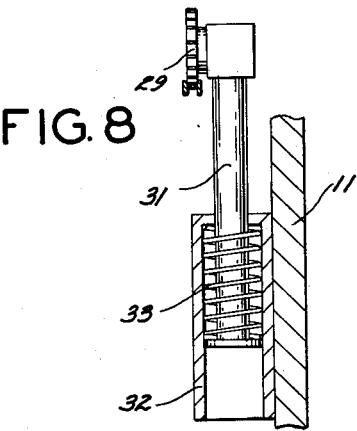
FIG. 9
INVENTOR.
RAYMOND BICKEL
BY
ATTORNEY United States Patent Office 3,135,305
Patented June 2, 1964

3,135,305
POWER FEEDER FOR A WOODWORKING MACHINE
Raymond Bickel, 3402 Marber Ave., Long Beach 8, Calif.
Filed Oct. 5, 1961, Ser. No. 143,179
4 Claims. (Cl. 143—55)

This invention relates to a power feeder for a woodworking machine whereby a board to be sawed is fed into the saw automatically, thus enabling the workman to keep his hands a safe distance from the saw.

An object of my invention is to provide a novel power feeder in which a plurality of rollers engage the board and feed this board into the saw over a work table, and holding the edge of the board against a laterally adjustable guide member which projects vertically above the work table.

Another object of my invention is to provide a novel power feeder which can be readily mounted on the adjustable guide member of the work table, and said power feeder can be readily shifted lengthwise of the guide member and laterally of the table with the guide member as might be required.

Still another object of my invention is to provide a novel power feeder which can be adjusted vertically to compensate for different thicknesses of the board which is to be cut.

Still another object of my invention is to provide a novel means of simultaneously driving all of the feed rollers at a constant speed, so that the board to be cut will be held tightly against the guide member, and where all of the feed rollers are rotated at the same speed.

Other objects, advantages and features of invention may appear from the accompanying drawing, the subjoined detailed description and the appended claims.

In the drawing:

FIGURE 6 is an end view of the power feeder.

FIGURE 7 is a sectional view taken on line 7—7 of FIGURE 4.

FIGURE 8 is a fragmentary sectional view taken on line 8—8 of FIGURE 4.

FIGURE 9 is a fragmentary sectional view taken on line 9—9 of FIGURE 5.

Figure 3:
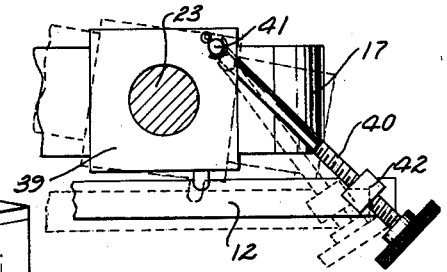
FIGURE 3 is a fragmentary top plan view of the feed roller adjusting device.
Figure 1:
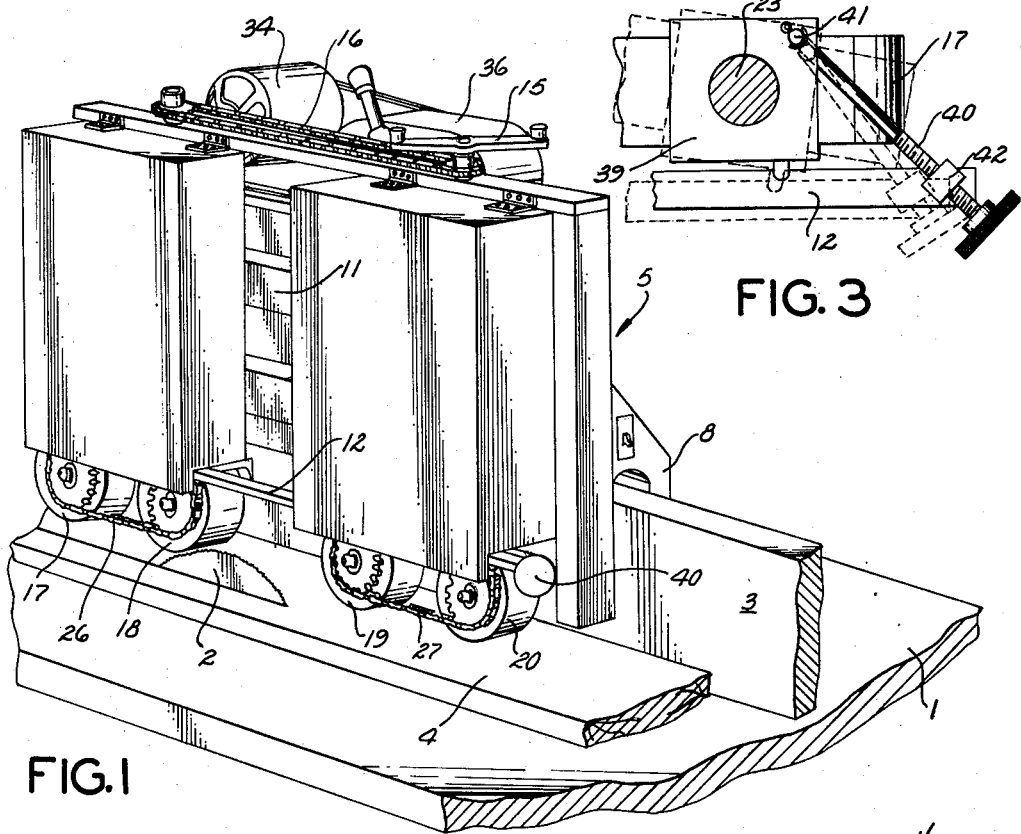
FIGURE 1 is a perspective view of my power feeder.
Figure 2:
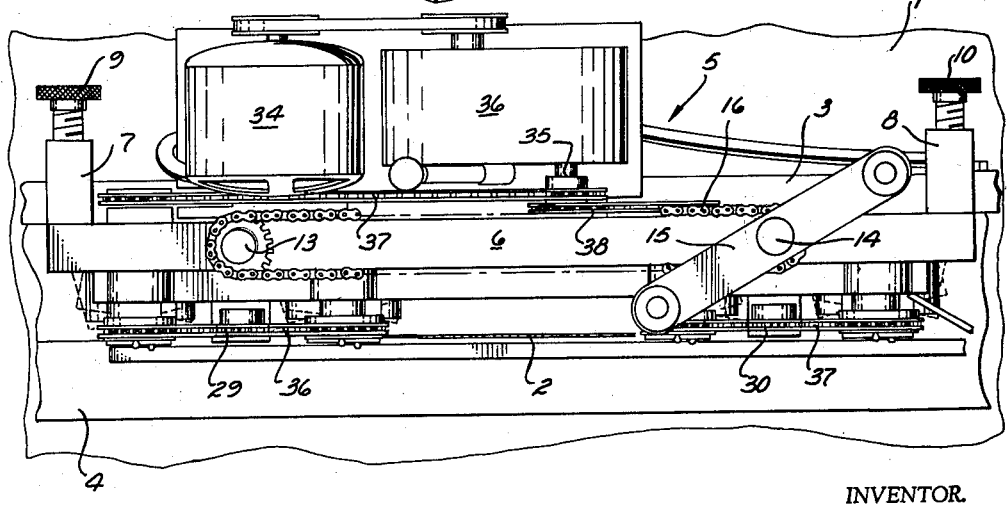
FIGURE 2 is a top plan view of the same.
Figures 4, 5:
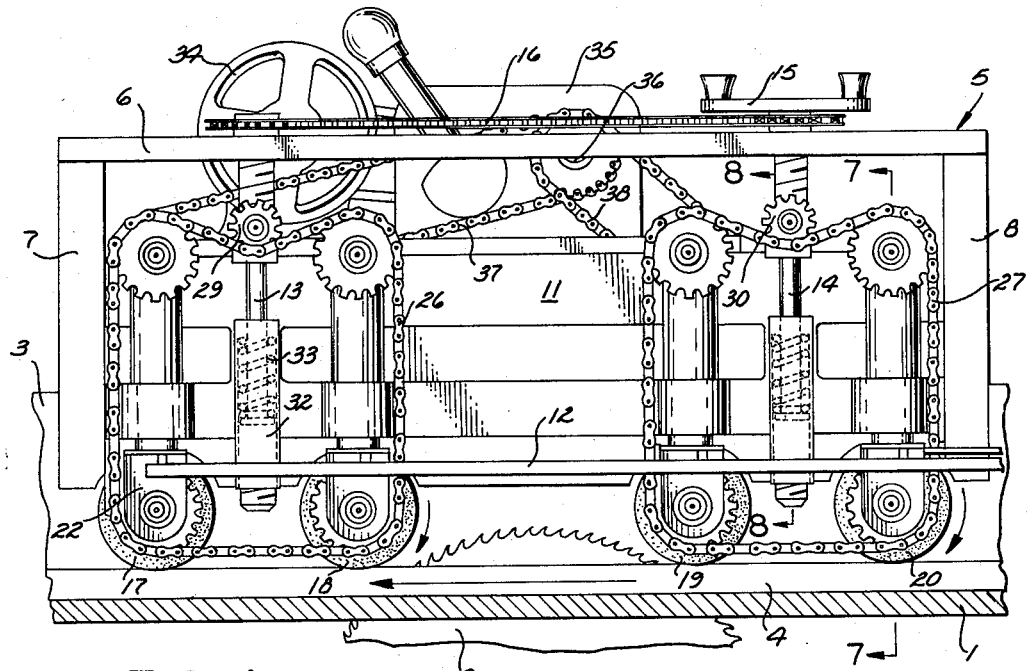
FIGURE 4 is a front elevation of my power feeder with the cover plates removed.
FIGURE 5 is a rear elevation of the same.

Referring more particularly to the drawing, the numeral 1 indicates the work table which usually consists of a heavy wooden or metal structure on which the saw 2 is mounted. The saw blade 2 is suitably rotated in the usual and well known manner, the details of which are no part of this invention. A guide member 3 is laterally adjustably attached to the top of the work table 1 and extends vertically above this table for the purpose of acting as a guide for one edge of the board 4 which is being sawed. In order that the board 4 may be properly cut by the saw 2, it is necessary that one edge of this board shall be pressed tightly against one face of the adjustable guide member 3, so that the cut may be accurate and straight throughout its entire length.

My power feeder 5 consists of a supporting frame 6 which is formed with inverted U-shaped saddles 7 and 8, one at each end thereof. The saddles 7 and 8 fit over the adjustable guide member 3 and are held in position by suitable clamps, such as the set screws 9 and 10 respectively, whereby the entire power feeder may be fixedly mounted on the guide member 3, and also may be moved longitudinally along the guide member to a position with relation to the saw 2, which is proper to feed the boards 4 into the saw.

A mounting frame 11 consists of a vertical plate, and also a horizontally extending lower plate 12 which thus makes a somewhat L-shaped frame structure. The various driving units are all supported or mounted on the mounting frame 11, as will be subsequently described. The mounting frame 11 can be adjusted vertically relative to the supporting frame 6 by the following structure: A pair of adjusting screws 13 and 14 are rotatably mounted in the supporting frame 6 and are threaded into the mounting frame 11. Thus simultaneous rotation of the adjusting screws 13—14 will raise or lower the mounting frame 11. This simultaneous rotation of the screws 13—14 is accomplished by a hand wheel 15, which is secured to the upper end of the screw 14 and the chain 16 which encircles sprockets on the upper ends of the screws 14 and 13. Thus rotation of the hand wheel 15 will permit simultaneous rotation of the adjusting screws 13 and 14 to move the frame 11 relative to the board 4 which is to be cut.

The feeding of the board 4 into the saw 2 is accomplished by means of four power driven rollers 17, 18, 19 and 20. Since these rollers are identical in construction and mounting, only one will be described in detail, see FIGURES 6 and 7. The roller 17 includes a spindle 21 which is supported in a fork 22. A spindle 23 rises from the fork 22 and this spindle is slidably mounted in a shell 24 which is secured to the mounting frame 11. A spring 25 bears against the upper end of the spindle 23 and presses the roller 17 downwardly against the top surface of the board 4. Thus the roller 17 is constantly urged with a spring pressure against the board 4. The rollers 17—18 are continuously and simultaneously rotated by means of the chain 26 and the rollers 19—20 are similarly simultaneously rotated by means of the chain 27. The spindles 21 of each of the feed rollers has a sprocket 28 attached to one end thereof over which the chain 26 extends for the purpose of rotating the feed rollers. The feed rollers 18, 19 and 20 are similarly provided with sprockets over which the appropriate chains move.

To keep the chains 26 and 27 taut, I provide idler sprockets 29 and 30 which engage the chains 26 and 27 respectively. Since the sprockets 29 and 30 are identical in construction and in mounting, only one will be described in detail, namely, the sprocket 29. See FIGURE 8. This sprocket is journaled on a shaft 31 which extends into a cylinder 32 on the mount in frame 11. A coil spring 33 in the cylinder 32 engages the shaft 31, to thus pull the shaft and sprocket 29 downwardly against the chain 26 to tension this chain and hold it in engagement with the sprockets which it encircles.

The power drive for the rollers 17, 18, 19 and 20 consists of an electric motor 34 which drives the drive shaft 35 through the gear box 36. The motor 34 and gear box 36 are both mounted on the mounting frame 11, substantially as shown. The drive shaft 35 drives two chains 37 and 38, and these chains drive the chains 26 and 27 respectively. The drive chain 37 encircles a sprocket on one of the shafts upon which the chain 26 moves, and the chain 38 similarly encircles a sprocket which is driven by the chain 27. Thus the drive chains 26 and 27 are simultaneously rotated and, in turn, the feed rollers 17, 18, 19 and 20 are rotated to feed the board 4 into the saw 2.

To turn one or more of the feed wheels 17, 18, 19 or 20 inwardly about a vertical axis, thus pushing the board 4 against the guide member 3, I may provide a structure such as shown in FIGURE 3. A block 39 on the spindle 23 is engaged by the adjusting screw 40. One end of the adjusting screw bears against the pin 41 to rotate the block 39 about a vertical axis, thus tilting the roller 17 slightly towards the guide member 3 and pushing one edge of the work piece against the guide member. The adjusting screw 40 is threaded through a nut 42 on the plate 12.

In operation: The power feeder is mounted on the work table 1 and attached to the vertically disposed laterally adjustable guide member 3 either ahead of, at the rear of, or straddling the saw 2. The board 4, which is to be sawed, is then moved into the saw 2 until the rollers 17, 18, 19 and 20 engage the board 4, and from then on the power driven rollers 17, 18, 19 and 20 will feed the board through the saw 2 without any further attention of the operator. Due to the tilt or camber of one or more of the feed rollers 17, 18, 19 and 20, the board 4 will have one edge thereof pressed against the guide member 3, and thus the board will be properly aligned with relation to the saw 2 so that a straight cut is made through the board 4. The feed rollers 17, 18, 19 and 20 are power driven by the driving motor 34, and these rollers will move continuously as long as boards are being fed against the saw blade 2. If boards of different thickness are being fed into the saw 2, an adjustment can be made of the rollers 17, 18, 19 and 20 by the hand adjusting wheel 15, which moves the frame in which the feed rollers are mounted either upwardly or downwardly, so that the feed rollers will frictionally engage the board which is moved through the saw. The feed rollers 17, 18, 19 and 20 are spring pressed against the board 4 which is to be cut by means of a coil spring 25 which engages the spindle 23 on each of the feed rollers 17, 18, 19 or 20.

The entire power feeder can be removed from the work table if it is desired to utilize the same at another location. Also the power feeder can be moved horizontally with relation to the cutting saw 2 as might be required by the operator.

Having described my invention, I claim:

1. In a power feeder for a woodworking machine, consisting of a work table, a laterally adjustable guide member including a vertically disposed guiding portion mounted on said work table and a rotating cutter on said work table, the combination comprising:
   a supporting frame,
   clamp means securing said supporting frame to the vertically disposed guiding portion of said guide means at any selected position longitudinally and vertically on said guide member,
   an adjustable mounting frame carried by said supporting frame,
   vertical adjusting means interconnecting the supporting frame and the mounting frame,
   a plurality of driven feed rollers rotatably journaled on said mounting frame,
   spring means engaging each of the feed rollers to urge said rollers toward the work table,
   a motor mounted on said mounting frame and,
   drive means interconnecting the motor to said feed rollers.

2. In a power feeder for a woodworking machine, consisting of a work table, a laterally adjustable guide member including a vertically disposed guiding portion mounted on said work table and a rotating cutter on said work table, the combination comprising:
   a supporting frame,
   clamp means securing said supporting frame to the vertically disposed guiding portion of said guide means at any selected position longitudinally and vertically on said guide member,
   an adjustable mounting frame carried by said supporting frame,
   a plurality of driven feed rollers rotatably journaled on said mounting frame,
   spring means engaging each of the feed rollers to press said rollers toward the work table,
   a motor mounted on said mounting frame and,
   drive means interconnecting the motor and said feed rollers,
   vertical adjusting screws interconnecting the supporting frame and the muonting frame and a manually operable means to rotate said adjusting screws.

3. In a power feeder for a woodworking machine, consisting of a work table, a laterally adjustable guide member including a vertically disposed guiding portion mounted on said work table and a rotating cutter on said work table, the combination comprising:
   a supporting frame,
   clamp means securing said supporting frame to the vertically disposed guiding portion of said guide means at any selected position longitudinally and vertically on said guide member,
   an adjustable mounting frame carried by said supporting frame,
   a plurality of driven feed rollers rotatably journaled on said mounting frame,
   a motor mounted on said mounting frame,
   drive chains interconnecting all of said feed rollers,
   drive means interconnecting said motor and said drive chains,
   vertical adjusting screws interconnecting the supporting frame and the mounting frame and manually operable means to rotate said adjusting screws.

4. In a power feeder for a woodworking machine, consisting of a work table, a laterally adjustable guide member including a vertically disposed guiding portion mounted on said work table and a rotating cutter on said work table, the combination comprising:
   a supporting frame,
   clamp means securing said supporting frame to the vertically disposed guiding portion of said guide means at any selected position longitudinally and vertically on said guide member,
   an adjustable mounting frame carried by said supporting frame,
   a plurality of driven feed rollers rotatably journaled on said mounting frame,
   a motor mounted on said mounting frame,
   drive chains interconnecting all of said feed rollers,
   drive means interconnecting said motor and said drive chains,
   and vertical adjusting means interconnecting the supporting frame to said mounting frame.

References Cited in the file of this patent

UNITED STATES PATENTS

| | | |
|---|---|---|
| 1,546,549 | Mangas | July 21, 1925 |
| 2,610,729 | Marcantel | Sept. 16, 1952 |
| 2,631,618 | Arvidson | Mar. 17, 1953 |
| 2,646,088 | Smith | July 21, 1953 |
| 2,696,852 | Dunton | Dec. 14, 1954 |
| 2,799,303 | Lee | July 16, 1957 |
| 2,801,656 | Ford | Aug. 6, 1957 |

FOREIGN PATENTS

| | | |
|---|---|---|
| 1,051 | Sweden | Dec. 1, 1887 |
| 623,090 | Germany | Dec. 13, 1935 |
| 1,131,949 | France | Oct. 29, 1956 |